United States Patent
Verbo et al.

[11] Patent Number: 6,079,208
[45] Date of Patent: Jun. 27, 2000

[54] MASTER CYLINDER WITH HYDRAULIC REACTION CAPABLE OF BEING CANCELLED

[75] Inventors: Ulysse Verbo, Aulnay sous Bois; Cédric Leboisne, Paris; Jean-Marc Attard, Chantilly, all of France

[73] Assignee: Bosch Systemes de Freinage, Drancy, France

[21] Appl. No.: 09/117,302
[22] PCT Filed: Jun. 24, 1998
[86] PCT No.: PCT/FR98/01328
  § 371 Date: Jul. 24, 1998
  § 102(e) Date: Jul. 24, 1998
[87] PCT Pub. No.: WO99/00283
  PCT Pub. Date: Jan. 7, 1999

[30] Foreign Application Priority Data
Jun. 27, 1997 [FR] France ................... 97 08122
Jan. 30, 1998 [FR] France ................... 98 01094

[51] Int. Cl.[7] .................................................. B60T 13/132
[52] U.S. Cl. .................................................. 60/553
[58] Field of Search .................................................. 60/553

[56] References Cited
U.S. PATENT DOCUMENTS
5,921,084  7/1999  Gautier ........................ 60/553

*Primary Examiner*—F. Daniel Lopez
*Attorney, Agent, or Firm*—Leo H McCormick, Jr.; Warren Comstock

[57] ABSTRACT

A master cylinder having a main piston (12) located in a main bore (110) of a body (11) to define a working chamber (13), a reaction piston (3) located in a stepped bore (120) of the main piston (12) to define a reaction chamber (4) with components to providing a hydraulic reaction to a pneumatic booster. The main piston (12) slides in the main bore (110) in response to a boost force to develop an actuation force while the reaction piston (3) slides in the stepped bore (120) in response as a function of the actuation force. A first shut-off seat (41) is located on a front face of the reaction piston (3) is located in the reaction chamber (4) while a second shut-off seat (42) located in the reaction chamber (4) is mounted on a seat support (7) carried by the main piston (12). A first spring (51) urges the reaction piston (3) in a direction most likely to move the first shut-off seat (41) away from the second shut-off seat (42). In response to a rapidly applied actuation force, the first shut-off seat (41) moves toward the second shut-off seat (42) to prevent the communication of the reaction force to the reaction piston (3).

4 Claims, 4 Drawing Sheets

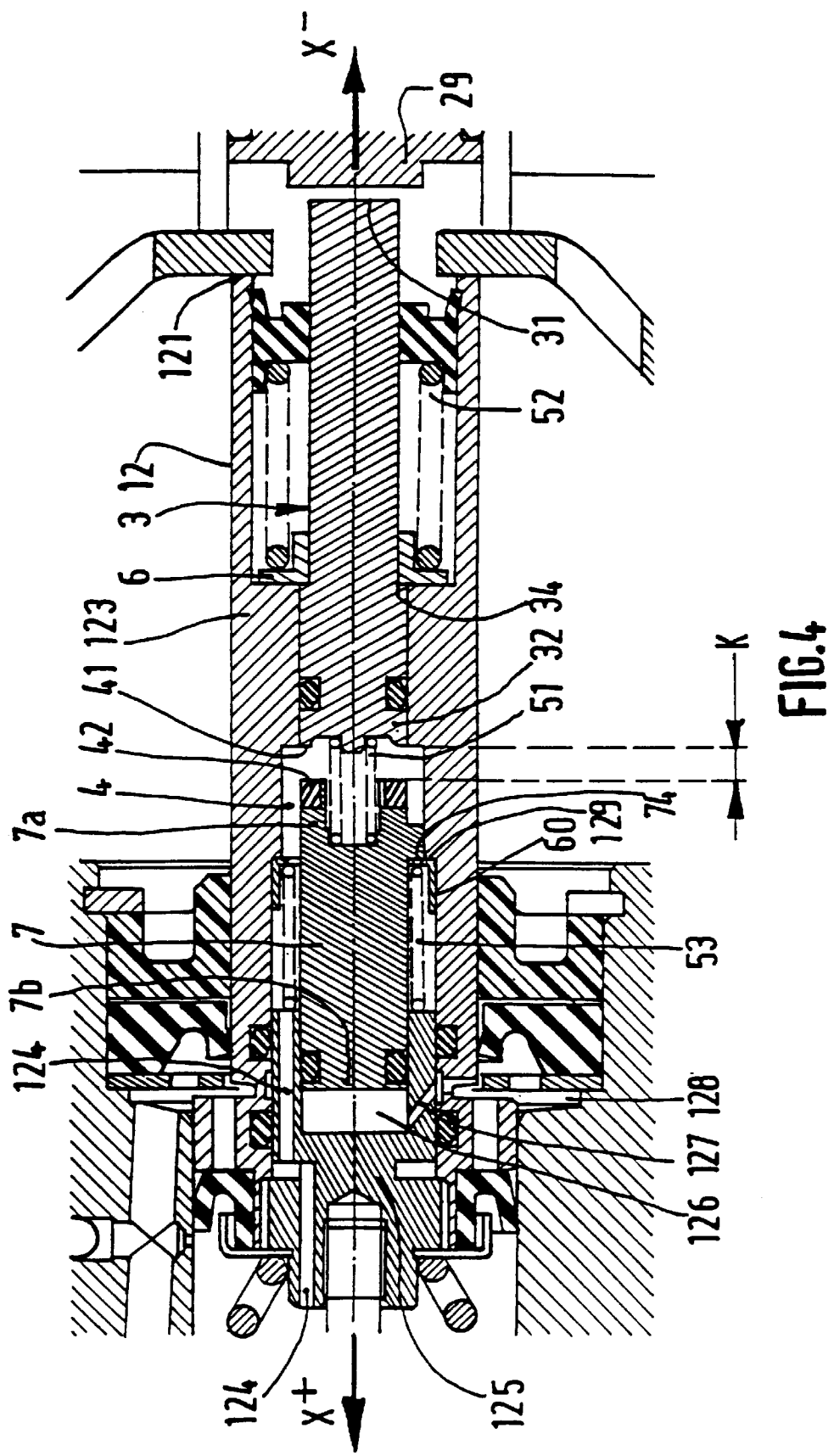

MASTER CYLINDER WITH HYDRAULIC REACTION CAPABLE OF BEING CANCELLED

The present invention relates to a master cylinder with hydraulic reaction for a pneumatic brake booster, comprising: a body pierced with a main bore; a cylindrical main piston pierced with a secondary bore, and, of which one end, outside the body, can receive a boost force directed in a first direction, this main piston being mounted so that it can slide, without leaking, in the main bore in order therein to delimit a working chamber which during operation is subject to a hydraulic pressure; and a reaction piston of which a first end, outside the body, is capable of receiving an actuating force directed in the first direction and of which a second end is mounted so that it can slide without leaking in the secondary bore in order therein to delimit a reaction chamber that communicates with the working chamber, the reaction piston being capable of moving, with respect to the main piston, through a travel with a non-zero minimum amplitude for an actuation force gradient that exceeds a given threshold.

BACKGROUND OF THE INVENTION

A master cylinder of this type is described, for example, in patent FR-2,724,354.

Devices of this type have been developed very recently for their ability to overcome the dynamic shortcomings of pneumatic brake boosters.

Now it is known that pneumatic brake boosters which are used to provide a force to assist with braking which is added to the actuating force exerted by the driver on the brake pedal and is in theory proportional to this force, have the shortcoming of being able to develop this boost force only after a certain delay from the application of the actuating force.

As the boost force is the result of the difference between the pneumatic pressures which there are on the one hand in a front chamber of the booster, this chamber being connected to a source of partial vacuum, and on the other hand in a rear chamber which is connected to atmosphere during braking, and as the delay in boost force compared with the actuating force is due to a limit on the rate at which atmospheric air is let into the rear chamber through the booster inlet valve at the time of braking, this delay is longer, the more abrupt the braking.

Now, the situations in which braking is rapid are generally emergency situations in which the driver would, by contrast, specifically need the greatest possible boost force as early as possible.

These considerations have quite recently led to the development of master cylinders with hydraulic reaction which, on the one hand, allow the booster inlet valve to open wider and therefore allow an increased air flow rate and, on the other hand, allow a dynamic modulation of the reaction force, that is to say a modulation as a function of the rate of brake application of the fraction of the boost force with which the reaction master cylinder opposes the actuating force in order to adjust the boost force as a function of this actuating force.

Using devices described in documents which have not been pre-published, it is thus possible considerably to reduce the reaction force in the event of emergency braking as compared with the value it would have for normal braking, and this allows a corresponding increase in the braking force available for emergency braking situations.

However, a problem still encountered in developing these devices is the difficulty of cancelling the reaction force in the event of violent braking.

SUMMARY OF THE INVENTION

The object of the present invention is to put forward a solution to this problem.

To this end, the master cylinder of the invention, which in other respects is in accordance with the preamble above, is essentially characterized in that it further comprises: a first shut-off seat formed on a front face of the second end of the reaction piston; a second shut-off seat mounted at a first end of a seat support arranged in the reaction chamber, at a distance from the first shut-off seat that is at most equal to the travel of minimum amplitude; and at least a first spring urging the reaction piston in a direction likely to move the first shut-off seat away from the second shut-off seat.

In one possible embodiment of the invention, the secondary bore is stepped and the reaction piston comprises a push-rod element, an annular element surrounding the push-rod element, and a tubular element following on from the push-rod element in the first direction, the first shut-off seat then being formed on the tubular element.

It is moreover possible to contrive for the response curve of the booster equipped with the master cylinder of the invention to have, as is conventionally the case, an initial jump, by ensuring that this master cylinder with hydraulic reaction comprises a second spring urging a moving ring in the first direction against an internal rest in the secondary bore, and in that the reaction piston comprises means for carrying along the moving ring, when this piston is moved, from a position of rest in a second direction which is the opposite direction to the first direction.

The seat support may, for its part, be integral with the main piston or able to move with respect to the main piston.

In the latter case, the seat support may be mounted in such a way that its second end slides in leaktight fashion in the main piston, this seat support being subjected, via its first end, to a pressure prevailing in the reaction chamber and, via its second end, subjected to a pressure lower than the pressure prevailing in the reaction chamber.

Other features and advantages of the invention will emerge clearly from the description thereof which is given hereafter by way of non-limiting indication, with reference to the appended drawings.

BRIEF DESCRIPTION OF THE DRAWINGS

FIG. 4 is a sectional view which can be distinguished from FIG. 2 by an alternative way in which the seat support is formed, this also being usable in the context of the second embodiment illustrated in FIG. 3.

DETAILED DESCRIPTION OF THE INVENTION

Figure 1:
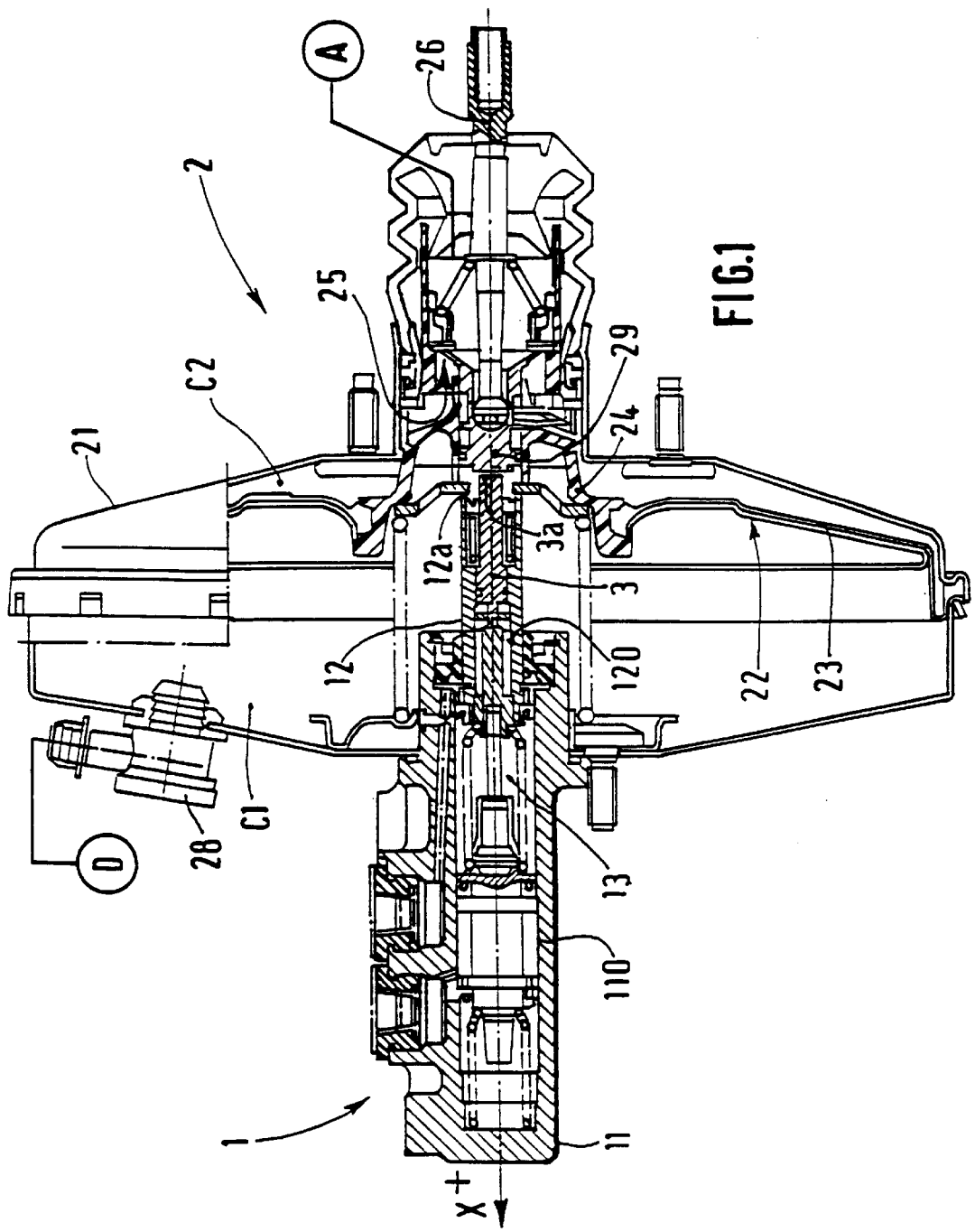
FIG. 1 is an overall sectional view of a booster incorporating the master cylinder of the invention.

As indicated earlier, the invention relates to a master cylinder with hydraulic reaction 1 intended to equip a pneumatic brake booster 2.

In a way known per se, the pneumatic brake booster comprises (FIG. 1) a rigid casing 21, a moving partition 22 comprising a rigid skirt 23, a pneumatic piston 24, a three-way valve 25 and an operating rod 26 actuated by a brake pedal (not depicted).

The moving partition 22 divides the interior volume of the rigid casing 21 in leaktight fashion into two pneumatic chambers C1 and C2 of complementary and variable volume.

The first chamber, or front chamber C1 is connected to a low-pressure source D via a non-return valve 28, and the second chamber, or rear chamber C2 can be connected selectively, by means of the three-way valve 25, either to the low-pressure source D or to a relatively high-pressure source A, for example the atmosphere.

Thanks to this arrangement which is known per se, actuation of the three-way valve 25, which makes it possible to connect the rear chamber C2 to the second source A, causes a difference in pressure between the front and rear chambers C1 and C2, the moving partition 22 thus being urged by a force which represents the booster boost force and moving within the casing 21.

In practice, the three-way valve 25 is borne by the piston 24 and whether or not it opens to the rear chamber is controlled by the application of an actuating force in an axial direction X+ on the operating rod 26, this rod itself being borne by the piston 24 and ending in a feeler 29.

The master cylinder 1 is aligned with the operating rod 26 and essentially comprises a body 11 from which there project a main piston 12 and a reaction piston 3, this reaction piston forming part of hydraulic reaction means that will be detailed subsequently and are more specifically covered by the invention.

The body 11 is pierced with a main bore 110, in which the main piston 12, of cylindrical shape and pierced with a secondary bore 120 that may be stepped (see FIG. 3), is mounted so that it can slide, without leaking, in order therein to delimit a working chamber 13 which during operation is subject to a hydraulic pressure.

The end 121 of the main piston 12, which end is outside the body 11, has a part against which the pneumatic piston 24 can rest, so that it can receive the boost force transmitted to this pneumatic piston 24 by the moving partition 22 as a whole and directed in the axial direction X+.

Similarly, a first end 31 of the reaction piston 3, which end is outside the body 11, has a part against which the feeler 29 can rest in order to receive the actuating force exerted by the driver in the axial direction X+ and transmitted through the operating rod 26.

The other end 32 of the reaction piston 3 is mounted so that it can slide, without leaking, in the secondary bore 120 in order therein to delimit a reaction chamber 4 which communicates with the working chamber 13, for example via ducts such as 124.

Bearing in mind the delay with which the boost force is developed as compared with the actuating force in the event of abrupt braking, the reaction piston 3 can move, with respect to the main piston 12, through a travel with a minimum amplitude K when the temporal variation in actuating force exceeds a given threshold, above which braking can be considered to be emergency braking.

The hydraulic-reaction means which more particularly form the subject-matter of the invention (FIGS. 2 to 4) essentially comprise, in addition to the reaction piston 3, a first shut-off seat 41, a second shut-off seat 42 and at least a first spring 51.

The first shut-off seat 41, which is formed on a front face 33 of the second end 32 of the reaction piston 3 is intended to cooperate with the second shut-off seat 42 which is mounted at a first end 7a of a seat support 7 arranged in the reaction chamber 4.

Figure 2:
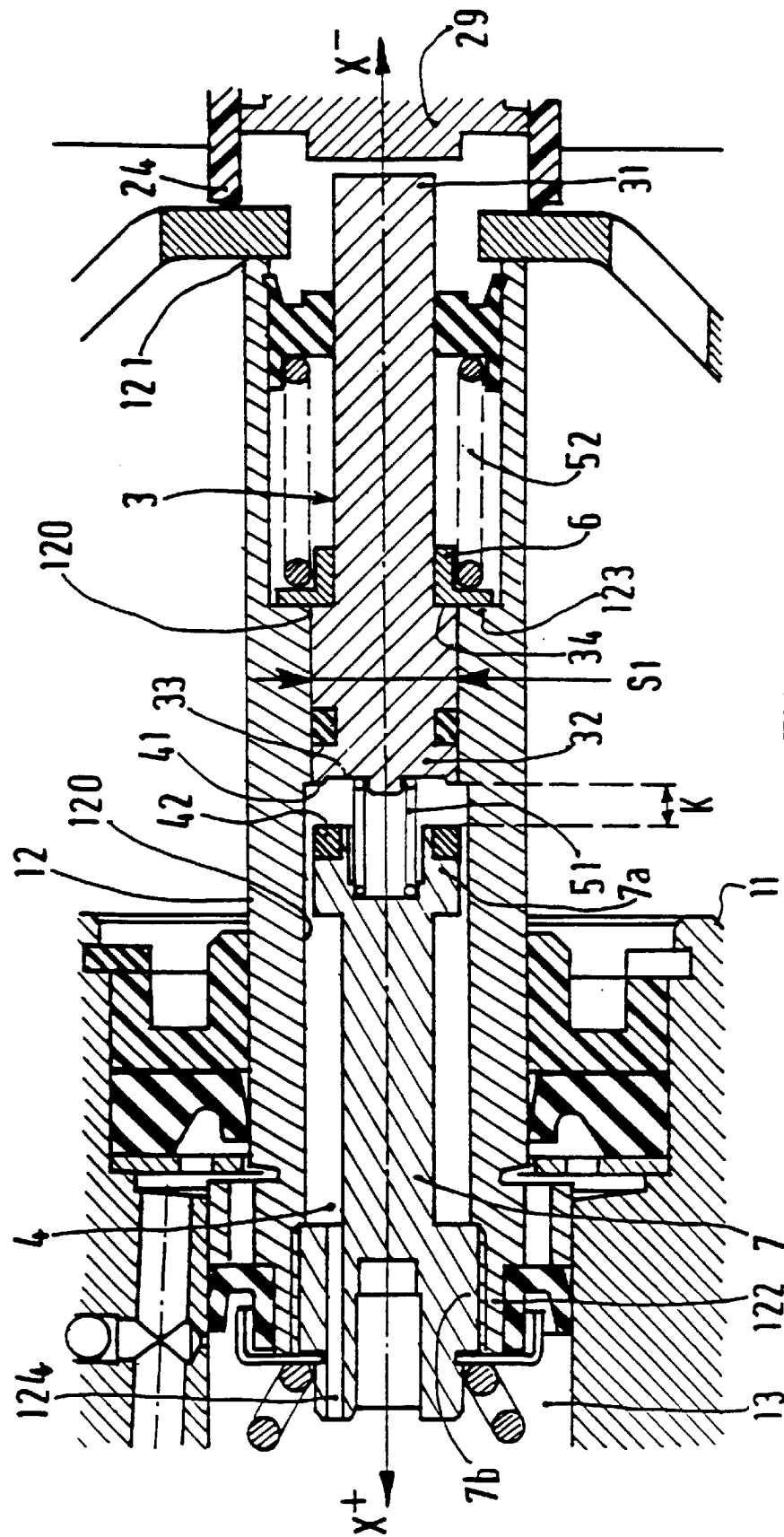
FIG. 2 is an enlarged sectional view of the part of the master cylinder in which the advantageous features of the invention are concentrated, for a first embodiment of this invention.
Figure 3:
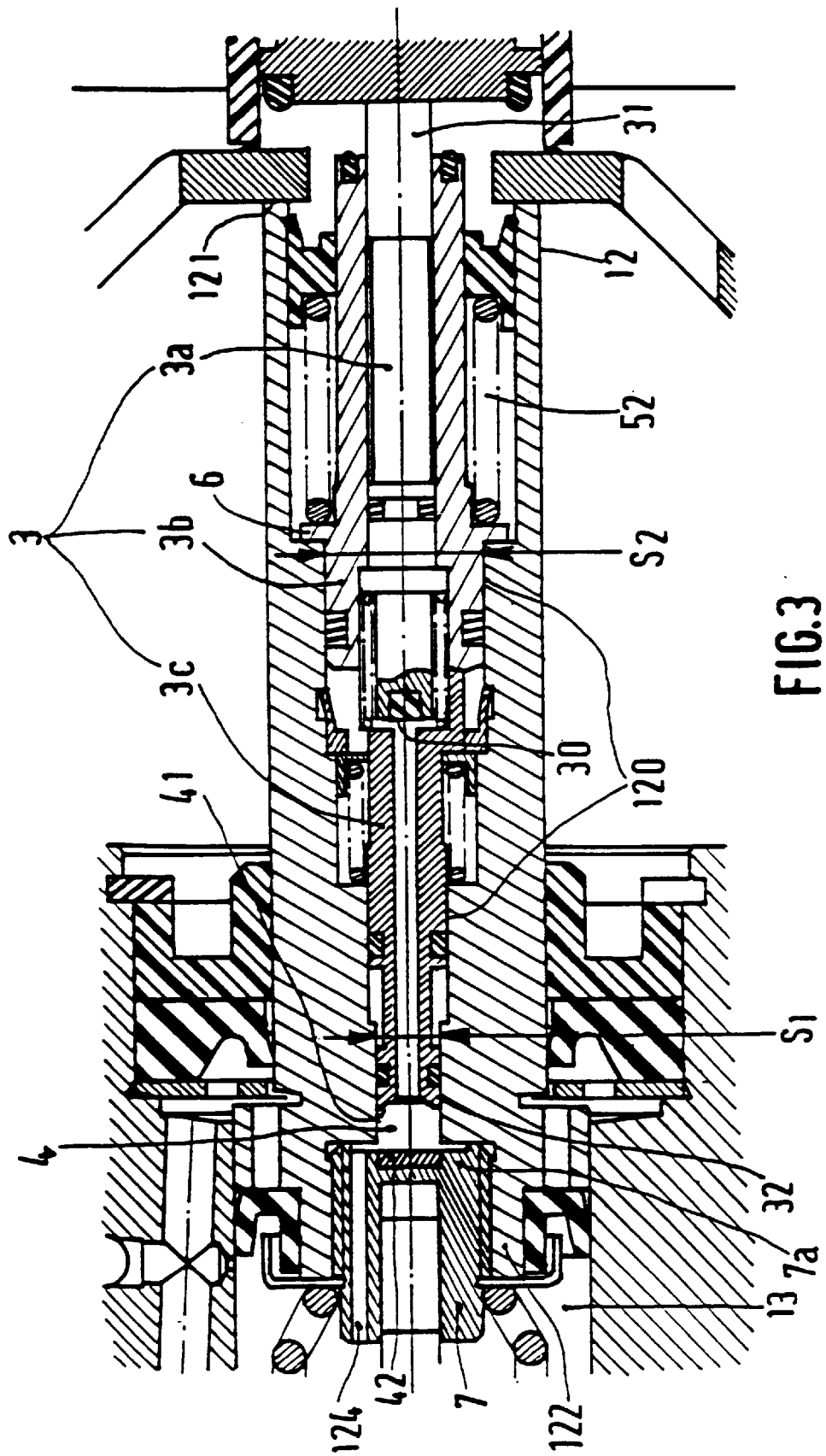
FIG. 3 is an enlarged sectional view of the part of the master cylinder in which the advantageous features of the invention are concentrated, for a second embodiment of this invention.

The seat support 7 may, for example, be formed of a part axially secured to the second end 122 of the main piston 12 by screwing and bearing the ducts 124, as shown in FIGS. 2 and 3, or may slide in leaktight fashion in the main piston 12, as shown in FIG. 4.

In all cases, the minimum distance separating the first shut-off seat 41 from the second shut-off seat 42, that is to say, in practical terms, the distance separating these two seats when the master cylinder is in the position of rest, as depicted in FIGS. 2, 3 and 4, is at most equal to the travel K, so as to allow the first seat 41 to bear against the second seat 42 in emergency braking situations.

The first spring 51, which has the function of urging the reaction piston 3 in a direction that tends to move the first shut-off seat 41 away from the second shut-off seat 42, is, for example, a spring that works in compression and is fitted between the seat support 7 and the reaction piston 3.

It may furthermore be advantageous, in order to reproduce the known brake pedal feel, for a second spring 52 to be provided, this second spring urging a moving ring 6 in the direction X+ against an internal rest 123 in the secondary bore, the reaction piston 3 comprising means, such as a shoulder 34, for carrying along the moving ring 6, when this piston is moved, from its position of rest, depicted in FIGS. 2, 3 and 4, in a direction X− which is the opposite direction to the actuating direction X+.

The way in which the master cylinder of the invention operates, described with reference to FIGS. 1 and 2, is as follows.

If an actuating force which varies relatively slowly is applied to the operating rod 26, the driving-in of the feeler 29 causes the valve 25 to open and therefore lets atmospheric air into the rear chamber C2 before the reaction piston 3 has been able to press the shut-off seat 41 against the second seat 42.

This being the case, the moving partition 22 exerts on the end 121 of the main piston 12 a boost force which moves the main piston in the direction X+ and opposes any relative movement between the reaction piston 3 and the main piston 12 in the direction X+ and therefore prevents contact between the seats 41 and 42.

In this operating mode, the hydraulic pressure in the working chamber 13 and in the reaction chamber 4, and which is therefore exerted on the entire cross section S1 of the end 32 of the reaction piston 3, ends up pushing the reaction piston 3 and the ring 6 back, compressing the spring 52, and thus causes a reaction force to appear on the feeler 29, the size of this force being that of the reaction forces conventionally employed in known boosters.

If an actuating force that varies relatively rapidly is applied to the operating rod 26, then the reaction piston 3, by contrast, allows the first shut-off seat 41 to bear against the second seat 42 before atmospheric air can be let into the rear chamber C2 in sufficient quantity to make the moving partition 22 exert on the end 121 of the main piston 12 a boost force that is capable of moving the main piston in the direction X+ and of taking up the movement of the reaction piston 3.

Now, as the first seat 41 is now resting against the second seat 42, and as the area of overlap of these two seats is, by definition, equal to the cross section S1 of the end 32 of the reaction piston 3, the hydraulic pressure in the working chamber 13 and in the reaction chamber 4, in this operating mode, stops being able to exert any reaction force whatsoever on the reaction piston 3.

It is thus possible in this way, thanks to the invention, to cancel out or practically cancel out the reaction force that opposes the actuating force exerted on the reaction piston 3 in the event of a rapid application of this actuating force, and thus to increase the actuating force available for emergency braking situations.

FIG. 3 illustrates this same inventive concept in the case where a more complicated reaction piston is used, this more complicated piston already in itself allowing two different modes of hydraulic reaction, these two modes nonetheless falling outside the specific subject-matter of the present invention.

In this case, the secondary bore 120 of the main piston 12 is stepped and the reaction piston 3 especially comprises a push-rod element 3a, an annular element 3b surrounding the push-rod element, and a stepped tubular element 3c arranged beyond the push-rod element 3a with respect to the first direction X+.

Such a reaction piston may, by construction, allow either a reaction force applied to the combined cross section S2 of the push-rod element 3a and of the annular element 3b, into which the ring 6 may be incorporated or, by closing a hydraulic valve 30 arranged between the push-rod element 3a and the tubular element 3c, allow a reaction force that is applied only to the cross section S1 of the end 32 of the reaction piston 3.

Applying the inventive concept to this arrangement, therefore involving providing the first shut-off seat 41 on the tubular element 3c and a second seat 42 similar to that of the first embodiment illustrated in FIG. 2 or to that of the alternative form illustrated in FIG. 4, thus makes it possible, in this second embodiment, too, to cancel out the reaction force for emergency braking situations.

As stated earlier, FIG. 4 illustrates an alternative way of producing the seat support 7.

In this alternative form, the seat support 7, the first end 7a of which bears the second shut-off seat 42, is mounted so that it slides in leaktight fashion via its second end 7b in the main piston 12, for example in a fixed end piece 125 of this piston, through which the ducts 124 pass.

The seat support 7 thus defines, in the main piston 12, a chamber 126 which is placed in communication, via a passage 127, with an annular space 128 subject to atmospheric pressure.

Thanks to these features, the seat support 7 is subjected, via its first end 7a, to the pressure prevailing in the reaction chamber 4 whereas via its second end 7b it is subjected only to atmospheric pressure, that is to say to an appreciably constant pressure lower than the pressure prevailing in the reaction chamber 4, and in practice negligible compared to this pressure.

A third preloaded spring 53, which urges, in the opposite direction X−, a second moving ring 60 interacting with a shoulder 74 of the seat support 7 and with a stop 129 of the main piston 12, is preferably provided in order to place the second shut-off seat 42 at the distance K away from the first shut-off seat 41 when the master cylinder is in the state of rest.

Under these conditions, not only does a quick actuation of the master cylinder make it possible, by mutual contact between the shut-off seats 41 and 42 to cancel the hydraulic reaction put up, in slow regimes, to the movement made by the reaction piston 3 in the direction X+, but the mobility of the seat support 7 in the direction X+ even allows the reaction piston 3 to move by an additional amount relative to the main piston 12 after the meeting of the shut-off seats 41 and 42, unlike what happens when the seat support is integral with the main piston 12.

Thus, the alternative embodiment of seat support 7 in FIG. 4, which can be used just as easily with a reaction piston as illustrated in this figure as with a reaction piston as illustrated in FIG. 3, allows the booster valve 25 to open wider and therefore allows an additional reduction in the response time of this booster.

We claim:

1. A master cylinder with hydraulic reaction for a pneumatic brake booster, comprising:

a body pierced with a main bore;

a cylindrical main piston pierced with a stepped secondary bore, said main piston being located in said main bore with a first end which is located outside of said body, said main piston receiving a boost force directed in a first direction, said main piston sliding in said main bore to delimit a working chamber, said working chamber being subjected to a hydraulic pressure developed by said main piston sliding in said main bore; and a reaction piston having a first end which is located outside of said body and a second end located in said secondary bore to define a reaction chamber, said reaction piston receiving an actuation force directed in said first direction such that said second end slides in said secondary bore to delimits a reaction chamber, said reaction chamber being in communication with said working chamber, said reaction piston moving with respect to said main piston as a function travel with a non-zero minimum amplitude for an actuation force gradient that exceeds a given threshold; said reaction piston being characterized by a push-rod element, an annular element surrounding said push rod element, and a tubular element extending from said push rod element in said first direction, a first shut-off seat formed on a front face of said tubular element; a second shut-off seat mounted at a first end of a seat support integral with said main piston and located in said reaction chamber; said second shut-off seat being located at a distance from said first shut-off seat that is approximately equal to said travel of said minimum amplitude; and at least a first spring which urges said reaction piston in a direction to move said first shut-off seat away from said second shut-off seat.

2. The master cylinder as recited in claim 1 wherein said seat support has a second end which slides in said main piston, said seat support being subjected by way of said first end to a pressure lower than the pressure prevailing in said reaction chamber.

3. The master cylinder as recited in claim 1 further comprising a second spring for urging a moving ring in said first direction against an internal rest in said secondary bore, said reaction piston on moving carrying said moving ring from a position of rest in a second direction which is opposite to said first direction.

4. The master cylinder as recited in claim 3 further comprising a third spring for urging a second moving ring in said second direction, said second moving ring interacting with a shoulder on said seat support and with a stop on said main piston to locate said second shut-off seat a predetermined distance from said first shut-off seat.

\* \* \* \* \*